(12) United States Patent
Liou

(10) Patent No.: US 6,534,023 B1
(45) Date of Patent: Mar. 18, 2003

(54) FLUID DYNAMIC OZONE GENERATING ASSEMBLY

(76) Inventor: Huei Tarng Liou, P.O. Box 23-166, Taipei (TW)

( * ) Notice: Subject to any disclaimer, the term of this patent is extended or adjusted under 35 U.S.C. 154(b) by 253 days.

(21) Appl. No.: 09/669,956

(22) Filed: Sep. 26, 2000

(51) Int. Cl.[7] .................................................. B01J 19/08
(52) U.S. Cl. ........................... 422/186.18; 422/186.19; 261/76; 261/DIG. 75
(58) Field of Search ....................... 422/186.18, 186.19; 261/76, DIG. 75

(56) References Cited

U.S. PATENT DOCUMENTS

| | | | |
|---|---|---|---|
| 4,017,565 A | 4/1977 | Müller | 261/36 R |
| 4,051,204 A | 9/1977 | Müller et al. | 261/36 R |
| 4,882,129 A | 11/1989 | Andrews et al. | 422/186.2 |
| 5,034,198 A | * 7/1991 | Kaiga et al. | 422/186.18 |
| 5,302,325 A | 4/1994 | Cheng | 261/76 |
| 5,403,151 A | 4/1995 | Noyes | 415/182.1 |
| 5,427,693 A | 6/1995 | Mausgrover et al. | 210/739 |
| 5,520,856 A | 5/1996 | Garrett et al. | 261/76 |
| 5,525,310 A | 6/1996 | Decker et al. | 422/189.07 |
| 5,865,995 A | 2/1999 | Nelson | 210/205 |
| 5,871,701 A | 2/1999 | Long | 422/186.18 |
| 5,925,290 A | 7/1999 | Hills | 261/36.1 |
| 5,968,352 A | 10/1999 | Ditzler | 210/220 |
| 6,270,733 B1 | * 8/2001 | Rodden | 422/186.18 |

* cited by examiner

*Primary Examiner*—Kishor Mayekar
(74) *Attorney, Agent, or Firm*—Ladas & Parry

(57) ABSTRACT

A fluid dynamic ozone generator includes a coaxial gas-fluid mixing tube, an air-cooled ozone formation tube, and a liquid-pressurized gas-liquid mixer. The air-cooled ozone formation tube has an electric discharge region for inducing and sustaining micro-discharges. An oxygen-containing gas flowing through the region is capable of forming ozone. The air-cooled ozone formation tube is installed within the coaxial gas-fluid mixing tube. The liquid-pressurized gas-liquid mixer has an airtight container with an inlet pipe for gas-contained water. Undissolved gas leaves the water and, with the addition of water pressure, builds a positive pressure in the container. The positive pressure helps to dissolve the gas in the water.

5 Claims, 3 Drawing Sheets

FLUID DYNAMIC OZONE GENERATING ASSEMBLY

FIELD OF THE INVENTION

The present invention relates to a fluid dynamic ozone generator, which primarily comprises a coaxial gas-fluid mixing tube, an air-cooled ozone formation tube, and a liquid-pressurized gas-liquid mixer.

BACKGROUND OF INVENTION

Ozone has the advantage of leaving no residue and thus there is no upper limit of allowed dosage in using it. Beginning from the past few years, ozone has gradually replaced chlorine or hydrogen peroxide as a disinfectant and an advanced oxidant. However, due to the fact that ozone of high concentration is highly explosive, and that ozone will decompose within an hour unless it is stored in silicon gel under extremely low temperature, ozone must be produced on-site. When ozone is used, ozone generation system, and gas supply system, as well as cooling system should be needed. When ozone is applied to water treatment, a gas-liquid mixer should be provided to dissolve ozone into water. However, conventional gas-liquid mixers have the disadvantages of low gas dissolving rate and leakage of gas. The commonly used Venturi Tube contains two tubes of different diameters, for which the gas inlet port is at the junction of the two tubes and is of a point in size, therefore, the effective suction only covers a very small area, the rate of the gas sucked into the Venturi Tube is not satisfied. On the other hand, since accessories are required for ozone generation, the cost for ozone generation is expensive. All these factors result in the infeasibility of applying ozone to domestic use.

The present invention employs principles of fluid dynamics to design an innovative gas supply system which, compared with conventional Venturi Tube, has higher gas-suction rate, and in which the functions of ozone generation, cooling and gas dissolving can be combined in one device to form a fluid dynamic ozone generator. The ozone generator of the present invention not only simplifies the operation in ozone generation, but also significantly reduces the cost therefor, and consequently enables ozone to be widely used.

SUMMARY OF INVENTION

The present invention relates to a fluid dynamic ozone generator which primarily comprises a coaxial gas-fluid mixing tube, an air-cooled ozone formation tube, and a liquid-pressurized gas-liquid mixer, wherein the coaxial gas-fluid mixing tube employs principle of fluid dynamics, i.e., the speed of water flow differs when the water flows pass over surfaces of different slopes. The speed differential results in pressure difference and, accordingly, results in the function of sucking air. The coaxial gas-fluid mixing tube of the present invention has the characteristics of high efficiency of sucking air and compact in volume. The air-cooled ozone formation tube comprises a set of stainless tubes for guiding the gas (air or oxygen) thereinto to produce a closed gas flow path, a stainless brush for discharging in the tube, the advantages are that the efficiency for producing ozone is high, the amount of heat carried away by the gas flow significantly reduces the temperature of the ozone formation tube. The liquid-pressurized gas-liquid mixer is installed at the outlet of the coaxial gas-fluid mixing tube with a pump connected for pumping water and consequently applying pressure to the gas (ozone) dissolved in the mixer. The installation like this prevents the gas from escaping the water in the form of bubbles, thus increases the gas-dissolving rate, and promotes the applicability of the present invention.

The fluid dynamics ozone generator comprising the coaxial gas-fluid mixing tube, the air-cooled ozone formation tube, and the liquid-pressured gas-liquid mixer is not only effective and efficient in ozone generation, but is also compact in volume, and easy for installation. The ozone generator of the present invention is therefore suitable for daily life use, such as drinking water disinfection, fruit and vegetable washing.

Figure 1:
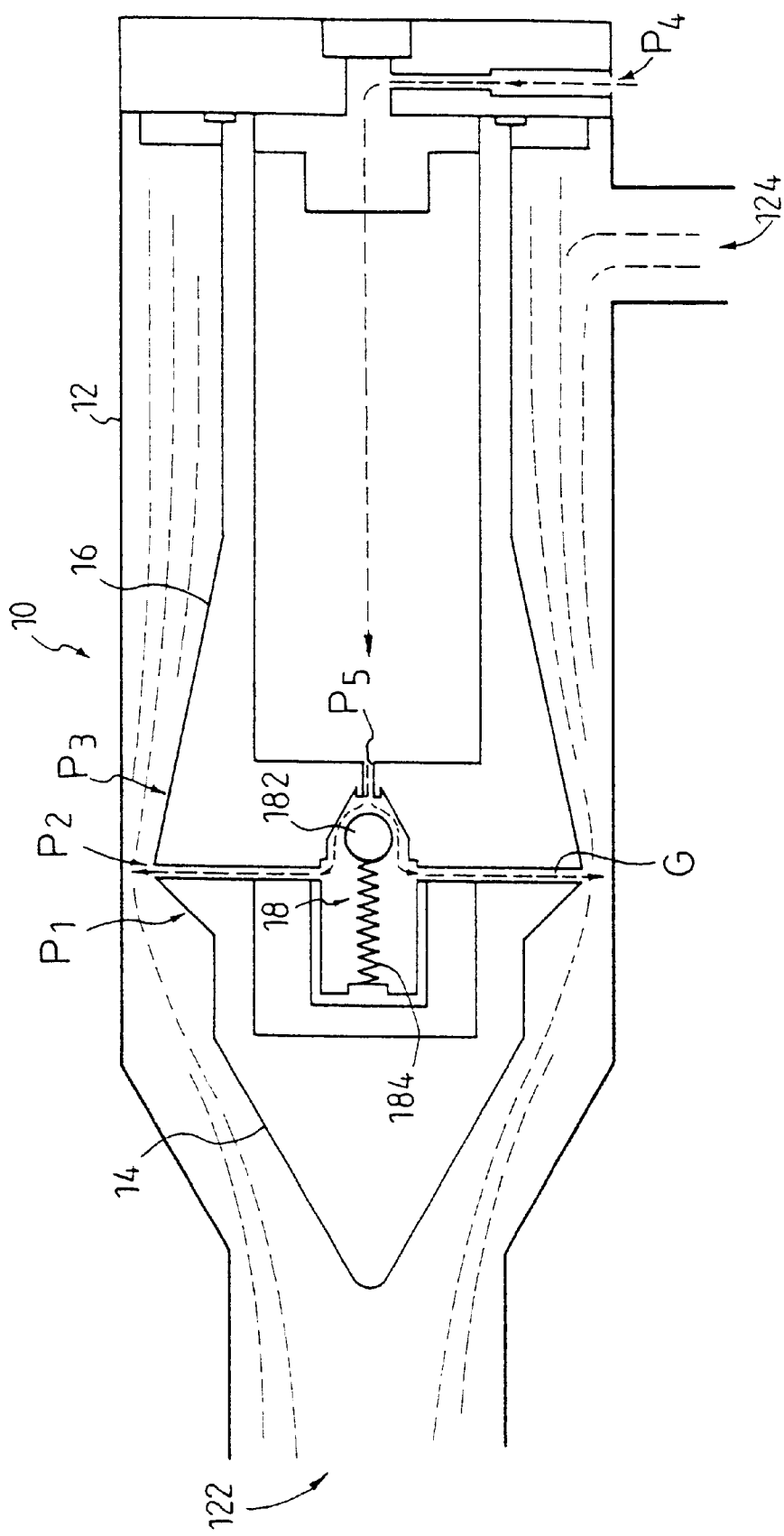
FIG. 1 shows the interior structure of a preferred embodiment of a coaxial gas-fluid mixing tube according to the present invention.

LIST OF REFERENCE NUMERALS 10 coaxial gas-fluid mixing tube
12 outside tube
122 water inlet
124 water outlet
14 first conical tube
16 second conical tube
18 check valve
182 Teflon ball
184 spring
20 liquid pressured gas-liquid mixer
202 container
204 water/gas inlet pipe
206 water outlet pipe
208 pressure gauge
210 pressure relief valve
30 cir-cooled ozone formation tube
302 quartz tube
304 stainless brush
306 electrode
308 gas flow tube
40 pump
42 y-shaped filter
44 regulating valve
G gap

DETAILED DESCRIPTION OF PREFERRED EMBODIMENT

As shown in FIG. 1, the coaxial gas-fluid mixing tube 10 primarily comprises an outside tube 12 and an inside tube (not labeled), wherein the outside tube 12 is generally in a cylindrical shape with hollow interior, and one end of which is water inlet 122 (upstream site); the other end of which is provided at least one water outlet 124 (downstream site). The inside tube comprises a first conical tube 14 and a second conical tube 16. The first conical tube 14 has a conical head and a base, wherein the conical head is oriented toward the water inlet 122 of the outside tube 12; the second conical tube 16 is a conical tube with its outer diameter gradually becoming smaller from the upstream site to the downstream site, and forming a large end and a small end. The base of the first conical tube 14 is arranged to a position beside the large end of the second conical tube 16, and keeps a small gap G therebetween to form a gas-sucking gap. The first conical tube 14 and the second conical tube 16 are together to adapt themselves to the outside tube 12 to form a ring-shaped flow duct, which gradually becomes narrower, and then becomes wider along the axis thereof, and forms a throat amid the flow duct. The base of the first conical tube 14 and the large end of the second conical tube 16 are positioned next to each other and form a gas-sucking gap G near the throat.

When water flows via the water inlet 122 into the coaxial gas-fluid mixing tube 10, the flowing speed difference between $P_1$ and $P_3$ will cause pressure difference at $P_2$ (the throat), and suck in gas at $P_4$ (gas supply). The sucked gas passes $P_5$ and subsequently gas-sucking gap G formed between the first conical tube 14 and the second conical tube 16, and mixes with water after it flows out from $P_2$. A check valve 18 is provided amid the path between the gas-sucking gap G and the outside gas supply so that the fluid flowing between the outside tube 12 and inside tube cannot enter into the second conical tube 16 through the gap G.

In the coaxial gas-fluid mixing tube 10, since the gap G is formed between the conical tubes 14, 16, the gas will be sucked out from the gap G, and carried away by the water flow. The Venturi Tube, which is commonly used, is a combination of two tubes of different diameter. The gas in the Venturi Tube is sucked out at the point where the two tubes join, and the covered sucking area is essentially a point. By contrast, the covered sucking area in the present invention is ring-shaped, its effect is significantly better than that of the Venturi Tube. According to the experimental results, under the same input power, the rate of the gas sucked into the coaxial gas-fluid mixing tube will be four times as that of the Venturi Tube.

The left side in FIG. 1 displays a check valve 18, which is installed at the location to fit the first conical tube 14 and second conical tube 16. The check valve 18 primarily comprises a spring 184 (preferably made of stainless) and a Teflon ball 182. One end of the second conical tube 16, which is next to the first conical tube 14, is formed into a conical recess. A through hole $P_5$ is formed at the tip of the conical recess. The spring 184 pushes the Teflon ball 182 to block the through hole $P_5$, and prevents the water from entering the interior of second conical tube 16 via the through hole $P_5$. At the instant that the flowing speed is higher than a certain level, the sucking force at $P_2$ will be large enough to resist the force of spring 184 such that the gas will force the Teflon ball 182 away from the conical recess, therefore, the gas will merge into the water flow via $P_5$.

Figure 2:
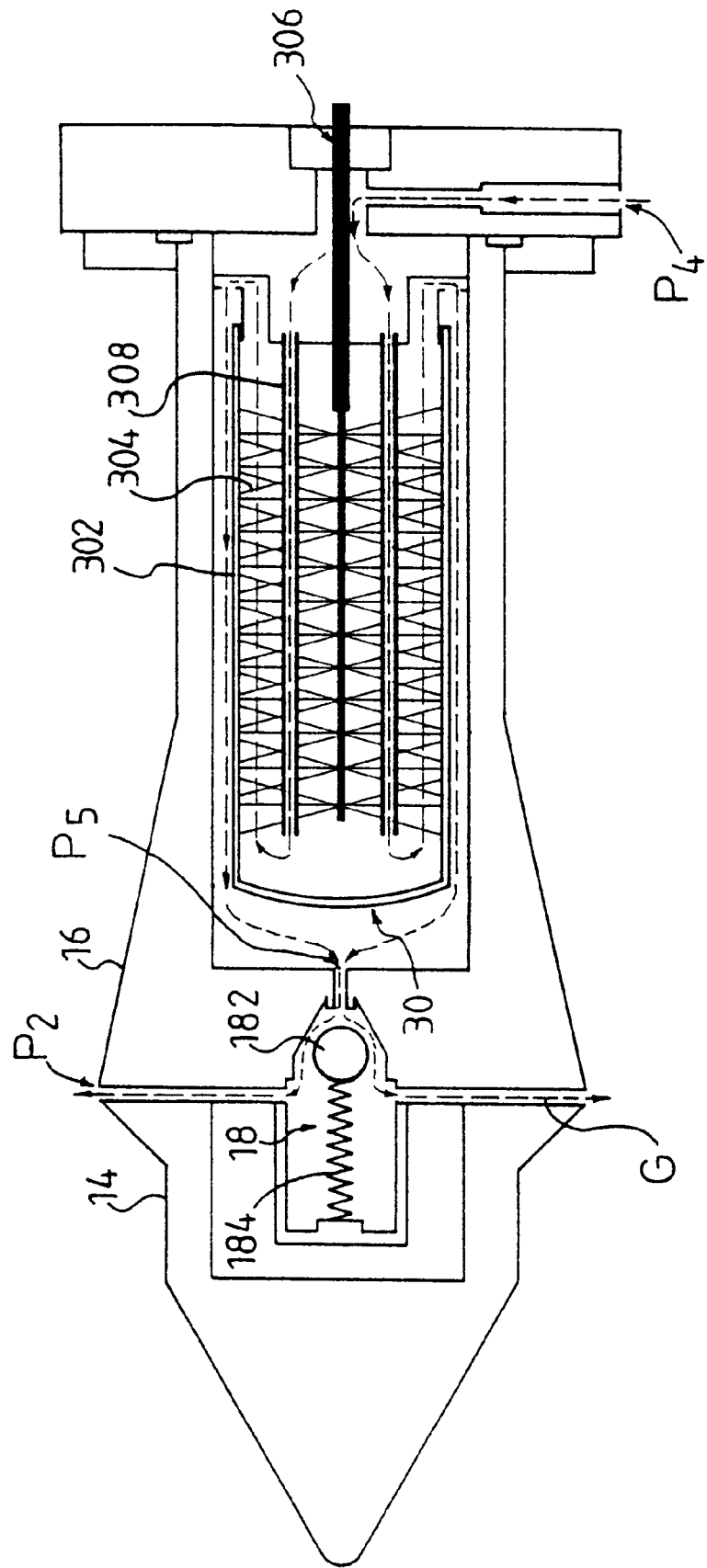
FIG. 2 shows the interior structure of a preferred embodiment of air-cooled ozone formation tube according to the present invention, which is installed in the coaxial gas-fluid mixing tube.

Shown in FIG. 2 is an air-cooled ozone formation tube 30, which is installed in the coaxial gas-fluid mixing tube 10. The air-cooled ozone formation tube 30 primarily comprises a quartz tube 302, a stainless brush 304, and gas flow tubes 308, wherein the quartz tube 302 has a sealed end, and serves as a dielectric for discharge. The stainless brush 304, which serves as an electrode, is installed in the quartz tube 302. A power supply of high voltage is provided to the stainless brush 304 via the electrode 306, and causes micro-discharge between the outside surface of the quartz tube 302 and the inner surface of the second conical tube 16 of the coaxial gas-fluid mixing tube 10, a region where the ozone is generated. When water flows through the exterior of the coaxial gas-fluid mixing tube 10, the air or oxygen needed to generate ozone is sucked in from gas supply at $P_4$ and guided by the gas flow tube 308 to reach the sealed end, thus carries the heat generated in the quartz tube 302. The air or oxygen then flows back via the micro-discharge region outside of the quartz tube 302, where ozone is generated, then flows through the check valve 18 at $P_5$ and the gas-sucking gap G and merges with the water. The water also has cooling effect on the micro-discharge region.

Figure 3A:
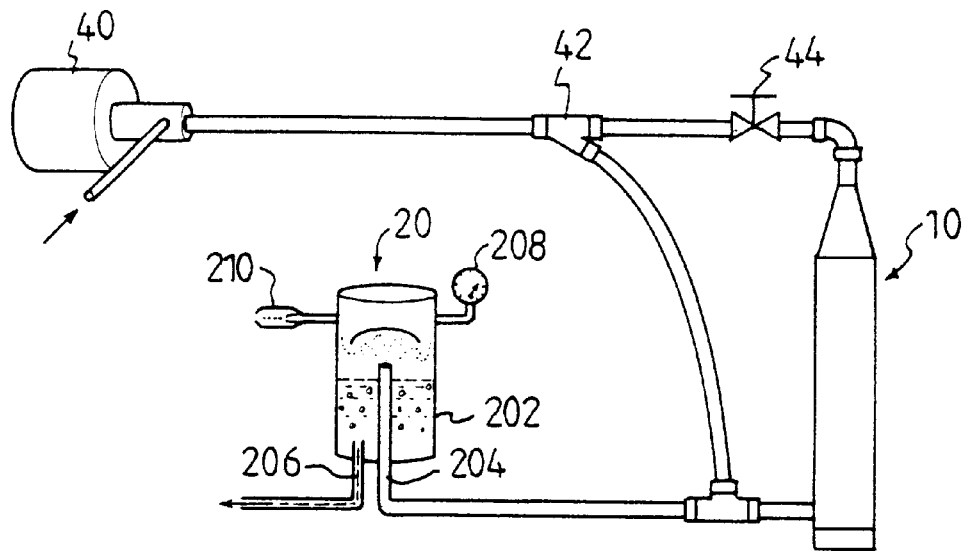
FIG. 3a shows a diagram of the coaxial gas-fluid mixing tube in serial parallel connection with the pump and a liquid-pressurized gas-liquid mixer connected thereto.
Figure 3B:
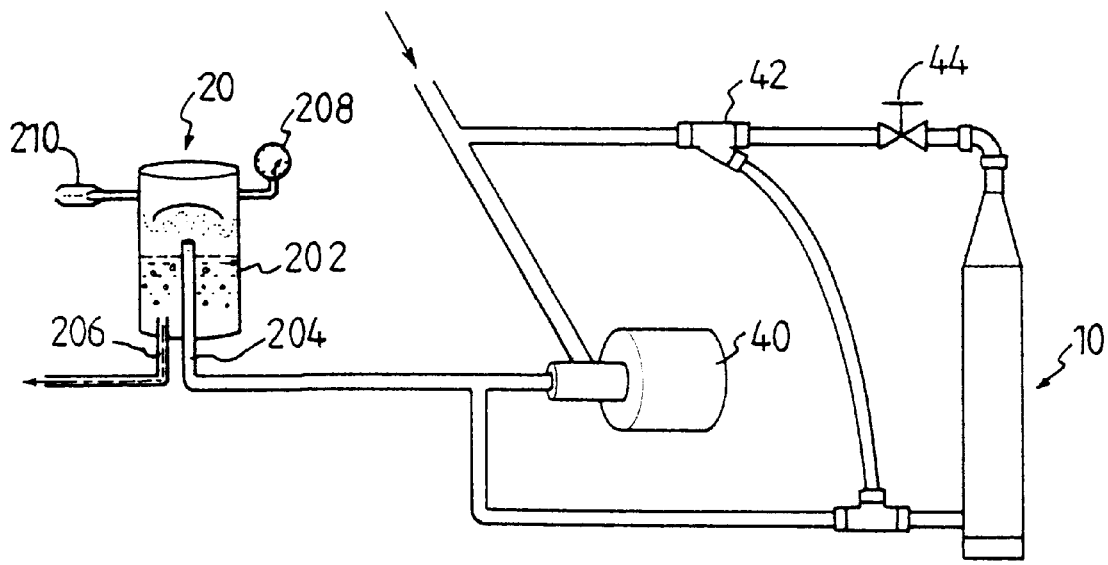
FIG. 3b shows a diagram of the coaxial gas-fluid mixing tube in parallel connection with the pump and a liquid-pressurized gas-liquid mixer connected thereto.

Shown in FIGS. 3a and 3b is a liquid pressured gas-liquid mixer 20, the function thereof is to increase the amount of ozone dissolved in water and to reduce the amount of gas bubbles in the water flow. The mixer primarily comprises a container 202, a water/gas inlet pipe 204, and a water outlet pipe 206. The container 202 is an airtight container, one end of which is sealed; the other end of which has two openings, one is fitted with a water/gas inlet pipe 204, the other is fitted with a water outlet pipe 206.

The ozone-contained water discharged from coaxial gas-fluid mixing tube 10 is transferred to the container 202 via the water/gas inlet pipe 204. The undissolved gas in the water will emerge therefrom and build up a pressure at the top in the container 202. When the mixer reaches equilibrium state, the total pressure is slightly lower than the sum of the pumping pressure and the atmospheric pressure. Since the amount of gas dissolved in water increases with the pressure above the surface of the water, the mixer according to the present invention helps to increase the gas-dissolving rate. In addition, the pressure helps to expel the water out of the container 202. When the balance of pressure is reached, the exit of water/gas inlet pipe 204 is higher than the surface of the water, thus reduces the amount of gas bubbles flowing out from the water outlet pipe 206. On the other hand, a pressure relief valve 210 is installed near the top of the mixer 20 for safety purpose. The mixer 20 can be further provided with a pressure gauge 208 so that the operator can readily monitor the pressure inside of the mixer 20.

The coaxial gas-fluid mixing tube 10 is connected to the pump 40 in either a direct connection or a by-pass connection. Normally, the direction connection is suitable for an open flow system, which is usually pumped by a high head pump. No matter a direct connection or a by-pass connection is applied, a regulating valve 44 and y-shaped filter 42 are installed. The regulating valve 44 is used for adapting the pressure applied by the pump 40, it regulates the flow into the coaxial gas-fluid mixing tube 10 so that the appropriate gas-sucking rate can be obtained. The stainless steel mesh inside the y-shaped filter prevents particles from entering into the coaxial gas-fluid mixing tube 10. The particles will flow out through the by-pass path at the bottom of the y-shaped filter 42.

The result of an experiment, wherein a prototype of coaxial gas-fluid mixing tube of 5 cm in diameter, 30 cm in length is operated in a by-pass connection with a 2 HP pump, shows that a gas flow rate of 6 liter/min can be obtained. The experiment also demonstrates that a coaxial gas-fluid mixing tube of this size is very suitable for domestic use.

While the representative embodiment and details have been shown for the purpose of illustrating the invention, it will be apparent to those skilled in this art that various changes and modifications may be made therein without departing from the spirit or scope of the invention.

What is claimed is:

1. A coaxial gas-fluid mixing tube, comprising:
   an outside tube formed with an upstream end and a downstream end substantially opposite to the upstream end, in which the upstream end has at least one water inlet, and the downstream end has at least one water outlet;

an inside tube axially positioned within the outside tube between the upstream and downstream ends to form a flowing duct and thereby forming a liquid flowing path therebetween, the inside tube comprising a first conical tube and a second conical tube which are oppositely arranged and apart from each other to form a gas-sucking gap therebetween such that the flowing duct forms a throat which allows the flowing path to be narrowest at the gas-sucking gap, the inside tube further having a chamber formed therein which is connected to the flowing duct through the gas-sucking gap to form a gas flowing path from an exterior gas supply;

a check valve provided in the chamber to allow gas to flow one way from the inside tube to the outside tube via the gas-sucking gap.

2. The coaxial gas-fluid mixing tube according to claim 1, wherein the first conical tube has a conical head and a base of which the conical head is oriented toward the water inlet of the outside tube, and wherein the second conical tube has a diameter converges and then remains constant from the upstream end toward the downstream end.

3. A fluid dynamic ozone generating assembly comprising:

a coaxial gas-fluid mixing tube, comprising:

an outside tube formed with an upstream end and a downstream end substantially opposite to the upstream end, in which the upstream end has at least one water inlet, and the downstream end has at least one water outlet;

an inside tube axially positioned within the outside tube between the upstream and downstream ends to form a flowing duct and thereby forming a liquid flowing path therebetween, the inside tube comprising a first conical tube and a second conical tube which are oppositely arranged and apart from each other to form a gas-sucking gap therebetween such that the flowing duct forms a throat which allows the flowing path to be narrowest at the gas-sucking gap, the inside tube further having a chamber formed therein which is connected to the flowing duct through the gas-sucking gap to form a gas flowing path from an exterior gas supply; and a check valve provided in the chamber to allow gas to flow one way from the inside tube to the outside tube via the gas-sucking gap;

an air-cooled ozone formation tube, comprising:

a quartz tube having a flat closed end and an open end;

a stainless brush positioned in the quartz tube and electrically connected to an electric power to serve as an electrode; and a gas flow tube assembly axially arranged in the quartz tube to form a gas passage to allow gas outside of the quartz tube to flow from the open end through the gas flow tube assembly to the flat closed end of the quartz tube and then return to the open end thereof with the gas passing the stainless brush;

said air-cooled ozone formation tube is installed within the second conical tube of the inside tube of the coaxial gas-fluid mixing tube with the flat closed end thereof oriented toward the gap formed between the first and the second conical tubes.

4. The fluid dynamic ozone generating assembly according to claim 3, wherein the first conical tube has a conical head and a base, and the conical head is oriented toward the water inlet of the outside tube, and wherein the second conical tube has a diameter converges and then remains constant from the upstream end toward the downstream end.

5. The fluid dynamic ozone generating assembly according to claim 3, further comprising a liquid-pressured gas-liquid mixer, which includes:

an airtight container, having a top end and a bottom end;

an inlet pipe, connecting the container from the bottom end thereof to the water outlet of the flying tube, thereby conveying the liquid and gas coming out from the flying tube into the container;

an outlet pipe, connected to the container from the bottom end thereof, thereby introducing water out of the container.

* * * * *